Figure 1:
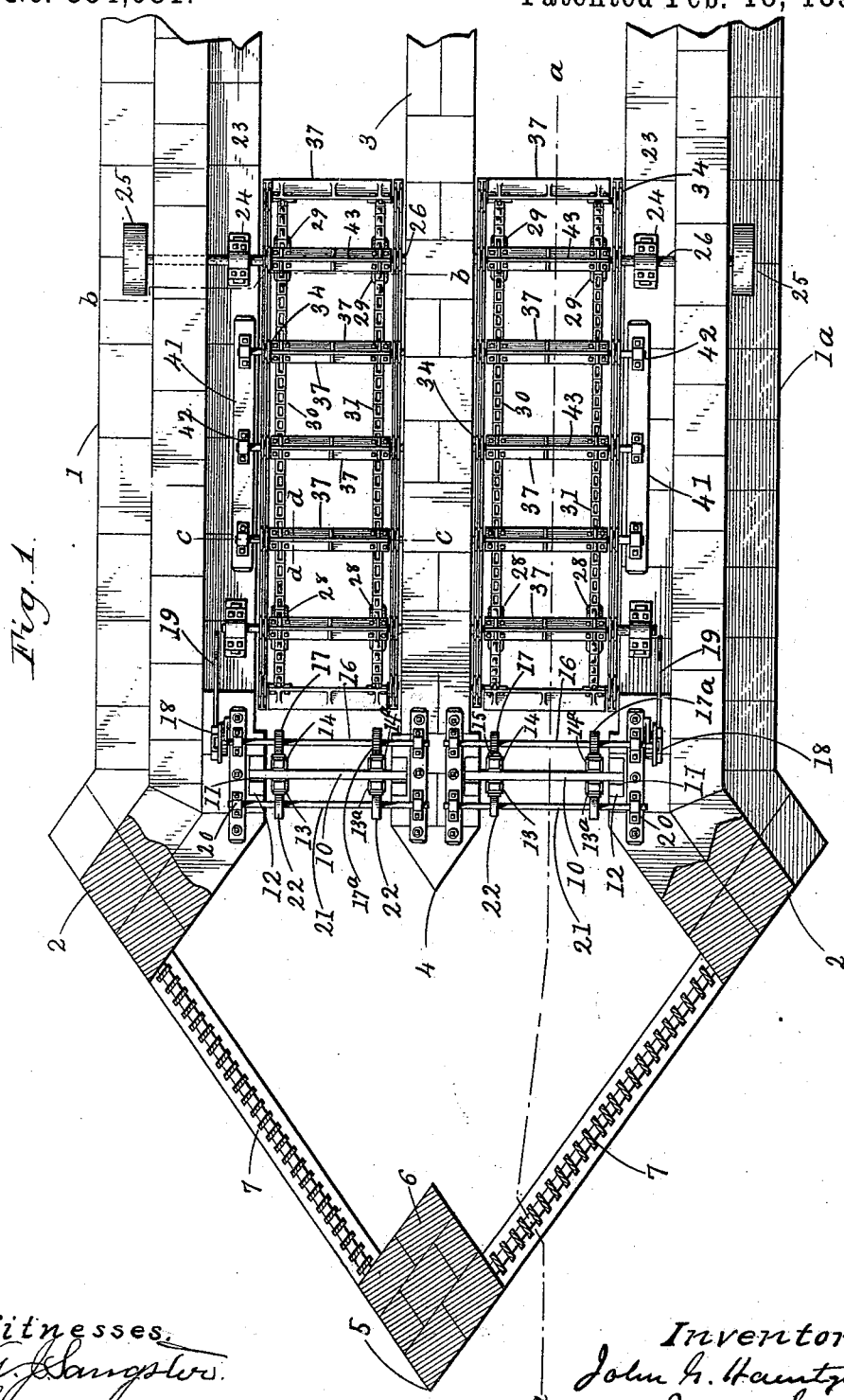

(No Model.)  2 Sheets—Sheet 1.

J. G. HAENTGES.
MEANS FOR UTILIZING CURRENTS OF RIVERS, &c.

No. 554,681.  Patented Feb. 18, 1896.

Witnesses  Inventor:

(No Model.) 2 Sheets—Sheet 2.
J. G. HAENTGES.
MEANS FOR UTILIZING CURRENTS OF RIVERS, &c.
No. 554,681. Patented Feb. 18, 1896.
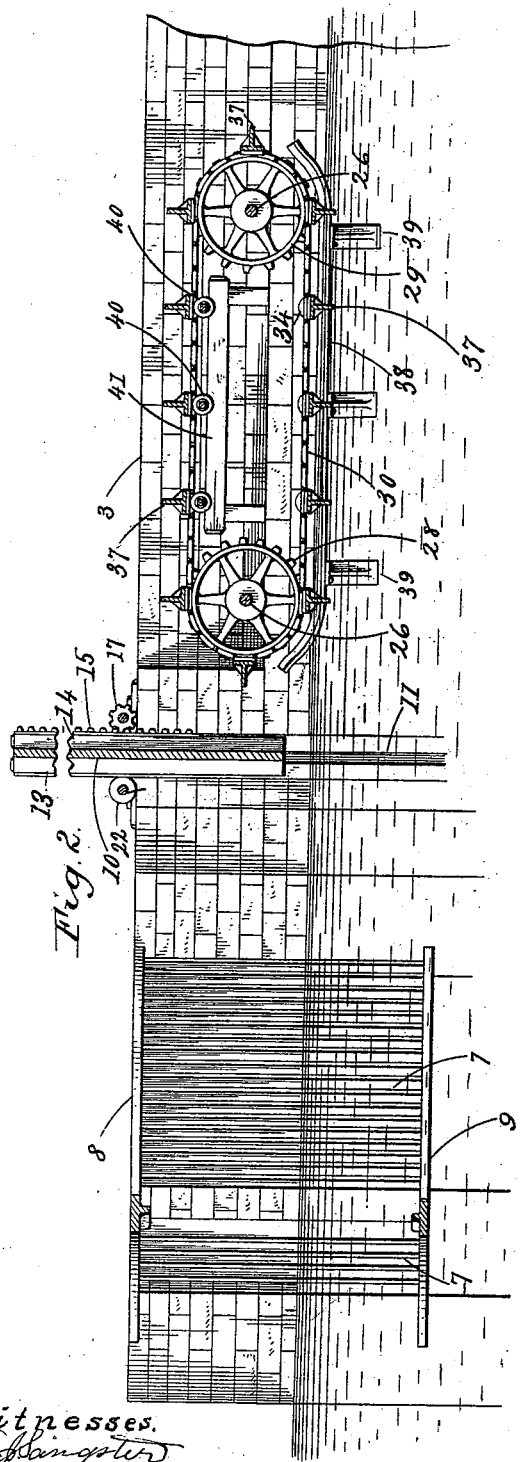
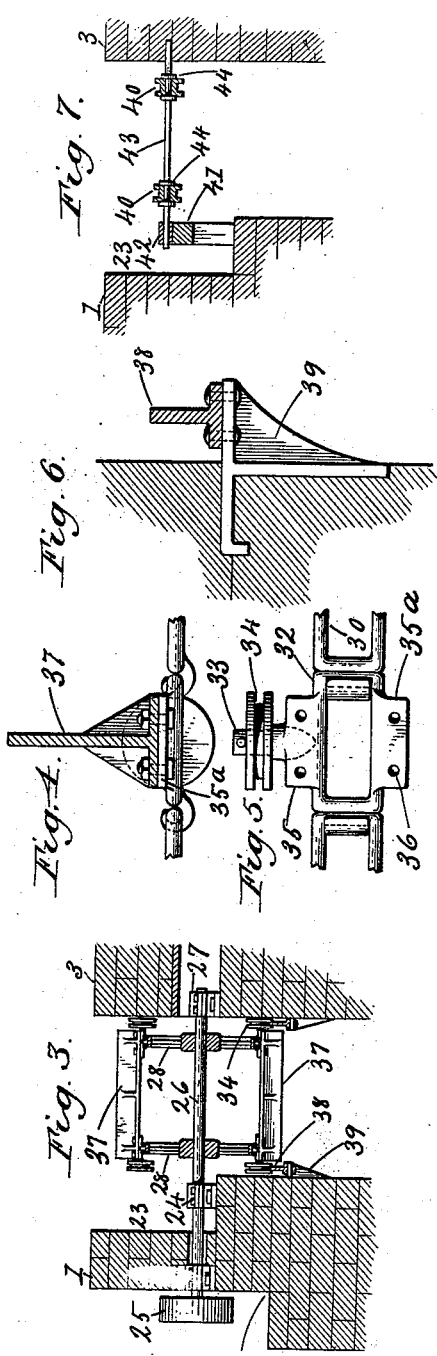
Witnesses.
Inventor.
John G. Haentges
By James Sangster, Atty.

UNITED STATES PATENT OFFICE.

JOHN G. HAENTGES, OF BUFFALO, NEW YORK.

MEANS FOR UTILIZING CURRENTS OF RIVERS, &c.

SPECIFICATION forming part of Letters Patent No. 554,681, dated February 18, 1896.

Application filed September 3, 1895. Serial No. 561,206. (No model.)

*To all whom it may concern:*

Be it known that I, JOHN G. HAENTGES, a citizen of the United States, residing in Buffalo, in the county of Erie and State of New York, have invented certain new and useful Improved Means for Utilizing the Currents of Rivers or other Water-Ways, of which the following is a specification.

My invention relates to an improved means for utilizing the currents of rivers or other water-ways, and will be fully and clearly hereinafter described and claimed, reference being had to the accompanying drawings, in which—

Figure 1 represents a top plan view of the whole apparatus complete. Fig. 2 represents a vertical longitudinal section on or about line $a\ a$, Fig. 1, through the entire apparatus. Fig. 3 is a transverse vertical section on or about line $b\ b$, Fig. 1, through one of the outside walls and a portion of the central wall, cutting also through the current-wheel. Fig. 4 represents an enlarged cross-section through one of the paddles on or about line $d\ d$, Fig. 1, showing a side elevation of one of the roller-links in the chain. Fig. 5 represents a top plan view of the same, showing a similar view of one of the chain-rollers, and an enlarged top view of one of the roller-supporting links, the paddle being omitted. Fig. 6 represents a cross-section through the inner portion of one of the walls, showing one of the track-supporting brackets and a cross-section through one of the roller-tracks. Fig. 7 is a transverse section on or about line $c\ c$, Fig. 1, of one of the outer and the central wall, showing a central section through two of the rollers for supporting the upper sides of the chains, showing also the stationary shaft upon which they turn, all parts beyond the section being omitted.

Referring to the drawings in detail, 1 and 1ª represent two substantially parallel stone walls, built and cemented together in the well-known way, so as to be sufficiently durable and strong for the purpose.

At the head or front end of each parallel wall is an outwardly-inclined wall 2, each part extending outward at an angle to the parallel walls, so as to inclose a larger area than the width of the channel between them, and thereby materially increase the force of the current passing through between the walls.

Centrally, or substantially so, between the walls is a central wall 3, extending the length of the parallel walls 1 and 1ª, or nearly so, and to a point 4 at the front end. (See Fig. 1, where this is shown.)

Extending from the end of each of the angular walls in a line projecting forward from each side and toward a point 5 or stone wall 6 (see Fig. 1) is a series of vertical grate-bars 7 to guard the wheel-channels from ice or other obstructions that might come down with the current and injure the water-wheels. These grate-bars are secured at the top and bottom by means of the supporting-rails 8 and 9, (see Fig. 2,) to which the bars are rigidly secured. The rails are rigidly secured to the walls.

At the front of each channel is a vertically-movable gate 10. (See Figs. 1 and 2.) It is fitted in a slideway 11, or grooves, so as to slide easily up or down therein. The slideway grooves 11 are usually made in pieces of hard timber 12—oak, for instance—firmly secured in the walls in any well-known way.

On one side of the gates 10 is rigidly secured by bolts in the usual manner the vertical supporting-beams 13 and 14, and directly opposite these beams on the opposite side of each gate are two more similar beams 13ª and 14ª. To each of the vertical beams 13ª and 14ª is rigidly secured a vertical rack-bar 15, and mounted in suitable bearings on the stone walls is a transverse shaft 16, carrying two toothed gear-wheels 17 and 17ª, adapted to gear in with the rack-bars 15.

On one end of each of the shafts 16 is secured a windlass rack-head 18, (see Fig. 1,) having mortises in which the removable handspikes 19 are used to operate it in raising and lowering the gates. At the opposite side of the gates is mounted in boxes 20 a shaft 21, carrying friction-rollers 22, the faces of which rest against the vertical beams 13 and 13ª, the object being to keep them in line and avoid friction as much as possible. The object of these gates is to provide a means for closing the water-channels for repairs, or for other purposes requiring the force of the current to be cut off, or for adjusting the force of the current, if for any reason it becomes necessary.

On the inner side of each outer wall is a longitudinal depression, thereby leaving a flat horizontal portion 23, on which is secured the journal-boxes 24, in which is mounted the end carrying the driving-pulley 25 of the current-wheel shafts 26, the opposite ends of said shafts being mounted in boxes 27 in the central wall. On the shafts 26 are mounted and rigidly secured the sprocket-wheels 28 and 29, a pair of such sprocket-wheels on each shaft.

The sprocket-chains 30 and 31 are large and strong and are provided at regular intervals along their length with links 32, (see Fig. 5,) having a lug 33 on one side adapted to receive the friction-rollers 34, and two flat portions 35 and 35ª provided with bolt-holes 36, through which the bolts pass for rigidly securing the paddles 37. (See Figs. 1, 2, and 3.) The rollers 34 are grooved rollers, and as they are mounted on the chains and move with them they run on a track 38, secured to the walls on brackets 39. These brackets 39 are rigidly secured to the walls, substantially as in Fig. 6, in which they are shown on an enlarged scale. The lower sides of the sprocket-chains are thus supported as they are moved along by the current. (See Fig. 2.)

The upper sides of the chains are supported by friction-rollers 40, as follows: On the depressed flat portion 23 of each outer wall is rigidly secured a frame portion 41. (See Figs. 2 and 7.) On these frames is mounted a series of supporting-boxes 42, in each of which is mounted and secured one end of a transverse shaft 43, the opposite end of the shaft being secured in the opposite wall. (See Fig. 7.) On the shafts 43 are loosely mounted between collars 44 the rollers 40 for supporting the upper under sides of the sprocket-chains, which rest upon them. (See Figs. 2 and 7.)

Although I have shown a suitable wheel for the purpose, any other well-known kind of water-wheel adapted for the purpose may be used; but I prefer the construction above described, because a larger number of paddles subject to the action of the current are in the water at the same time.

I claim as my invention—

1. In a current-motor, the combination of two outside walls resting on the bottom of the channel, each having at its head an angular wall extending forward and outward so as to increase the area of the opening at the head of the two outer walls, a series of vertical grate-bars secured by supporting-rails at the top and near the bottom of the channel at their lower ends, and extending from the outer walls forward and inward to a pointed supporting-wall resting on the bottom of the channel, a central wall having a pointed head, also resting on the bottom of the channel and located longitudinally between the two walls, thereby forming a gradually-enlarged mouth at the front of the two motor-channels, substantially as described.

2. In a current-motor, the combination of two outside walls each having at its head an angular wall extending forward and outward so as to increase the area of the opening at the head of the two outer walls, a central wall having a pointed head and located below the head of and longitudinally and centrally between the two outside walls, thereby forming two motor-channels each having a gradually-enlarged opening in front, a double series of grate-bars connecting the two outer walls and extending inward and forward of the central and outer walls and connecting with a pointed supporting-wall, and a motor located in each motor-channel, substantially as described.

3. In a current-motor, the combination of two outside walls having a flaring opening at their heads and a forward and inward series of protecting grate-bars meeting at a point, of a depressed longitudinal platform on the inner side of each outside wall, a central wall located longitudinally between the two outer walls, and a water-motor in each channel between the walls having its supporting-shafts mounted in boxes on the depressed longitudinal platform and their opposite ends mounted in boxes in the central wall, the motor consisting of a pair of sprocket-wheels rigidly secured to each shaft, sprocket-chains mounted on sprocket-wheels, a series of paddles secured to the sprocket-chains, and means for supporting the sprocket-chains at their upper and lower sides, substantially as described.

JOHN G. HAENTGES.

Witnesses:
A. J. SANGSTER,
JAMES SANGSTER.